(12) United States Patent
Hathaway et al.

(10) Patent No.: US 6,325,113 B1
(45) Date of Patent: Dec. 4, 2001

(54) DOSING DISPENSER FOR POWDER MATERIAL

(75) Inventors: John E. Hathaway, Ft. Wayne; Jeffrey L. Beaver, Indianapolis, both of IN (US)

(73) Assignee: Masco Corporation of Indiana, Indianapolis, IN (US)

( * ) Notice: Subject to any disclaimer, the term of this patent is extended or adjusted under 35 U.S.C. 154(b) by 0 days.

(21) Appl. No.: 09/496,925

(22) Filed: Feb. 2, 2000

(51) Int. Cl.[7] ............................................. B65B 1/00
(52) U.S. Cl. ................................. 141/83; 141/94
(58) Field of Search ..................... 141/83, 94; 177/148, 177/149

(56) References Cited

U.S. PATENT DOCUMENTS

| | | | | |
|---|---|---|---|---|
| 607,578 | * | 7/1898 | Watkins | 177/149 |
| 615,493 | * | 12/1898 | Richards | 141/83 |
| 618,893 | * | 2/1899 | Miller | 177/149 |
| 968,610 | * | 8/1910 | Thiele | 177/149 |
| 1,058,713 | * | 4/1913 | Bertram | 177/149 |
| 2,196,280 | * | 4/1940 | Thornhill et al. | 177/149 |
| 4,431,071 | * | 2/1984 | Magat et al. | 177/149 |
| 5,738,153 | * | 4/1998 | Gerling et al. | 141/83 |
| 6,000,444 | * | 12/1999 | Ishikawa et al. | 141/83 |
| 6,056,027 | * | 5/2000 | Patterson | 141/83 |
| 6,121,556 | * | 9/2000 | Cole | 141/83 |

* cited by examiner

*Primary Examiner*—J. Casimer Jacyna
(74) *Attorney, Agent, or Firm*—Kwadjo Adusei-Poku; Lloyd D. Dorigan

(57) ABSTRACT

A dosing dispenser for measuring and dispensing specific quantities, by weight, of a solid material, for example a powder or granular material, from bulk packaging to an application apparatus. The dosing dispenser includes a funnel for receiving the solid material, a valve mechanism for regulating the flow of solid material from the funnel, a balance beam, attached at one end to a resistance spring and at the other end to the application apparatus, and an indicator connected to the balance beam. As the solid material is introduced into the application apparatus, the weight of the material displaces the balance beam, which, in turn, displaces the indicator along a scale.

15 Claims, 6 Drawing Sheets

DOSING DISPENSER FOR POWDER MATERIAL

BACKGROUND OF THE INVENTION

I. Field of the Invention

This invention relates to a dispenser assembly for solid materials and, in particular, to an attachment for dispensing a specific dose of a solid material from a bulk supply container.

II. Description of the Prior Art

In a variety of applications, the dispensing of specific amounts of material from a bulk source can be critical. Liquid products are relatively simple to dispense in specific volumes. However, because powder materials can vary in size and density, the preferred means for dispensing dosages of powders is by product weight rather than volume. Such dosage dispensing can be critical in environmentally sensitive materials which require special handling and disposal.

The agricultural chemical industry has a potential environmental liability with disposal of empty liquid packaging which can contain trace remainders of the chemical product. The trend in the chemical industry is to convert to powdered chemicals packaged in water-soluble bags. These bulk packages contain quantities for treating a specific area. However, it becomes necessary to treat areas which require only a fraction of the bulk material. Simply dispensing such partial quantities can result in inaccurate measurements while also raising storage problems for the remaining material and the dispensing mechanism.

SUMMARY OF THE PRESENT INVENTION

The present invention overcomes the disadvantages of the prior known dispensing methods by providing an attachment capable of dispensing a specific dosage of a dry solid material, for example a powder or granular material, based upon the weight of the material, directly from the packaging to the application device.

The dispenser of the present invention attaches the bulk container containing material to be dispensed and the receiving reservoir with a dispensing mechanism. According to the invention, the dispensing mechanism allows a metered dosage, by weight, of material from the bulk container to be dispensed into the receiving reservoir without exposing the operator to the material and without any material falling to the ground.

The dispensing mechanism generally comprises a trigger attached to a linear valve, a balance beam attached at one end to a tension spring and attached at the other end to the receiving reservoir, the balance beam being free to pivot about a fulcrum point, and indicia means to indicate the weight of the material dispensed from the bulk container. As the trigger is activated, the valve opens to allow the material to flow from the bulk container to the reservoir. As the material is dispensed, the weight of the reservoir increases, pushing the reservoir downward against the force of the spring. This downward movement of the reservoir depresses reservoir end of the balance beam and moves an indicator which displays the increase in weight of the reservoir on a scale mounted within a viewing window or by some other means. When the desired amount of material is dispensed, as indicated by the weight of the material, the trigger is released. The receiving reservoir, containing the required amount of material, may then be detached from the dispensing mechanism. As described, the operator avoids all contact with the material inside the bulk container.

The dispenser can be constructed according to specific dosage requirements by altering the biasing force of the spring and incorporating quantitative indicia on the housing.

Because of the potential for handling toxic or corrosive solid materials, the invention may be constructed in a sealed configuration by employing a flexible bellows, preferably an expandable flexible tube, about the funnel and the reservoir. The bellows prevents spillage of the material being dispensed, as well as allows excess material to be returned to the bulk container, simply by inverting the dispenser.

Other objects, features and advantages of the invention will be apparent from the detailed description taken in connection with the accompanying drawings.

BRIEF DESCRIPTION OF THE DRAWING

The present invention will be more fully understood by reference to the following detailed description of a preferred embodiment of the present invention when read in conjunction with th e accompanying drawing, in which like reference characters refer to like parts throughout the views and in which.

DETAILED DESCRIPTION OF A PREFERRED EMBODIMENT OF THE PRESENT INVENTION

Figure 1:
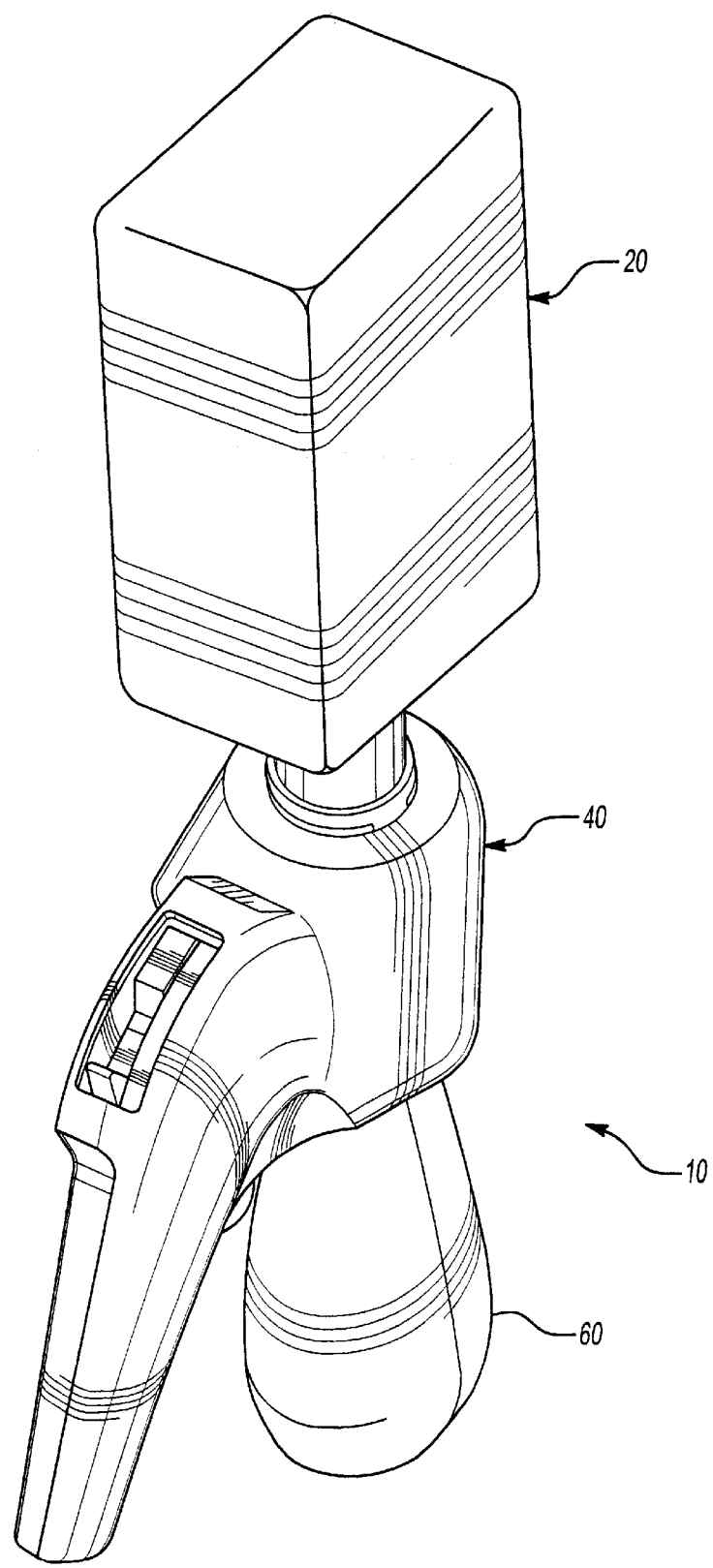
FIG. 1 is a perspective view of the dosing dispenser system of the invention.

FIG. 1 illustrates a dosing dispenser system 10 for dosing a specific quantity of a dry solid material, for example a granular or powder material, from a bulk container 20 into a reservoir 60, according to the present invention. The dosing dispenser 40 provides a closed passageway to facilitate dispensing precise amounts of the solid material into the receiving reservoir 60. As one representative example, the dosing dispenser system 10 may be used to measure and dispense a desired quantity of an agricultural chemical into a mixing tank. As the chemical may be toxic or corrosive, only the amount necessary is dispensed without any operator contact with the chemical. The dosing dispenser system 10 of the present invention measures the desired quantity by weight for convenient dispensing of the dose to the applicator as will be subsequently described.

Figure 2:
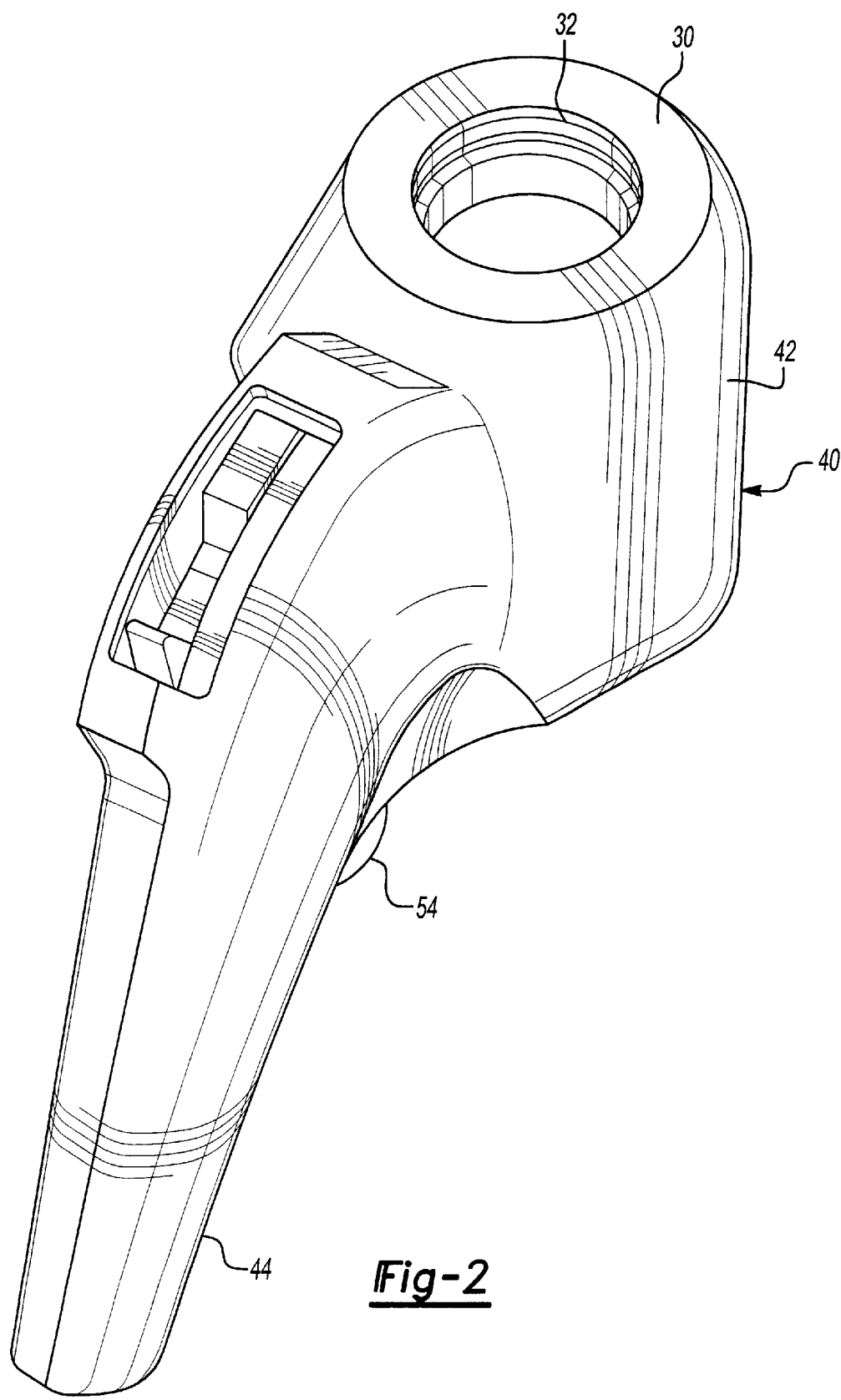
FIG. 2 is a perspective view of the dosing dispenser.
Figure 3:
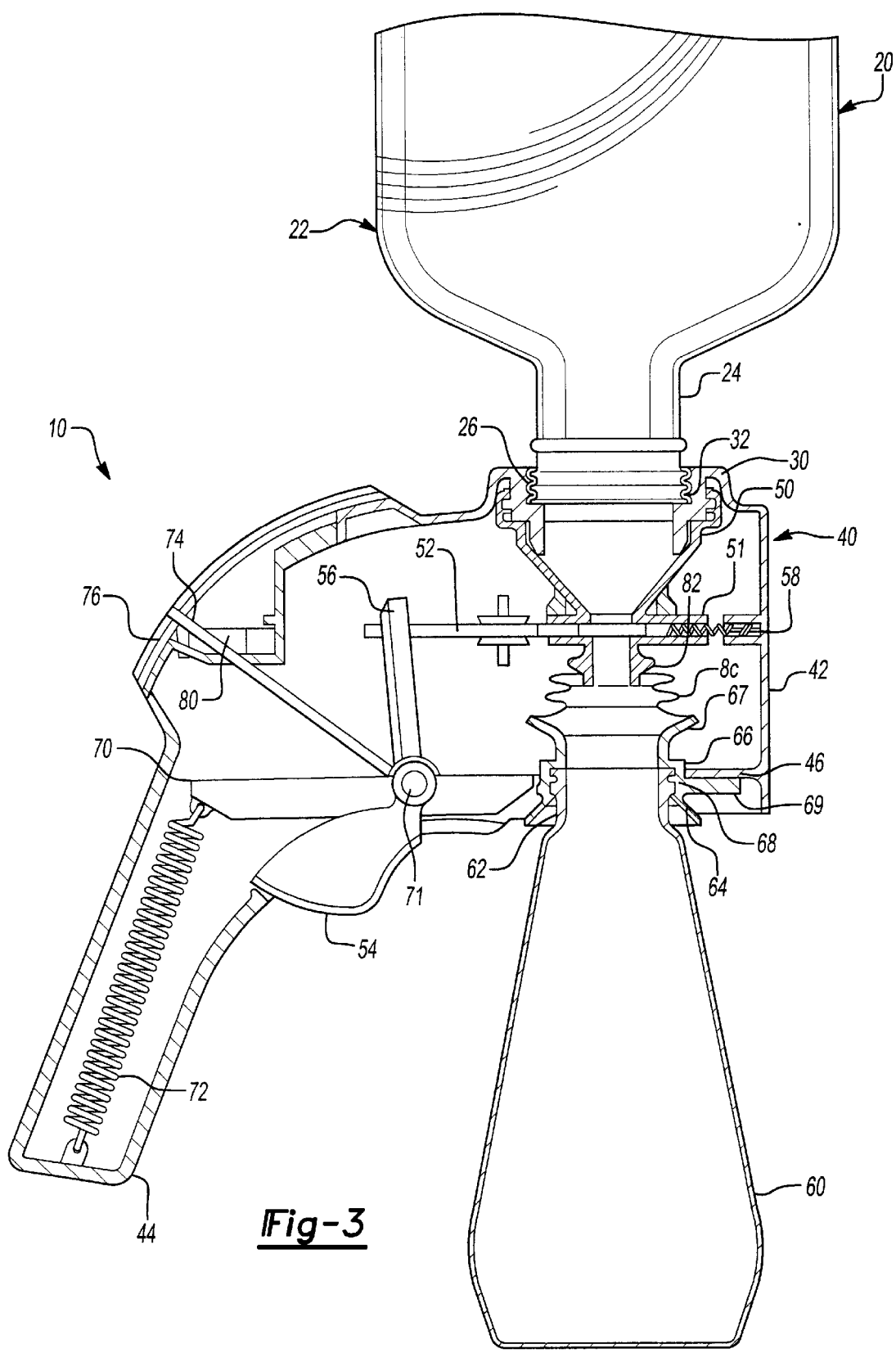
FIG. 3 is a cross-sectional view of a dosage dispenser system having the material container and receiving reservoir attached.

FIG. 2 illustrates the dosing dispenser 40 without the bulk container 20 and the reservoir 60 attached. As shown in FIG. 3, the dosing dispenser system 10 generally comprises a bulk container 20, attached to the top or receiving end of a dispenser mechanism 40, and a reservoir 60, attached to the bottom or dispensing end of the dispenser mechanism 40. The bulk container 20 is shown in FIG. 3 as having a cylindrical body 22 and a neck portion 24. The neck portion 24 has external threads 26 thereon for threaded engagement with the dispensing mechanism 40. It is evident, however, that any bulk container may be used provided the container is capable of secure attachment with the dispensing mechanism 40.

In a preferred embodiment of the invention, bottle thread adapters of varying sizes and inner thread diameters may be used to receive bulk containers of varying neck sizes. As shown in FIG. 3, a bottle thread adapter 30 is threadedly inserted into the housing 42 of the dispenser mechanism 40. The bulk container 20 is screwed into the adapter 30, thereby securing the container 20 to the dispensing mechanism 40. Specifically, the bottle thread adapter 30 is secured within a funnel 50 to facilitate introducing the material from the bulk container 20 into the reservoir 60. Preferably, the adapter 30 creates a closed environment between the bulk container 20 and the funnel 50.

The dispenser mechanism 40 is housed within housing 42. The housing 42 is shaped so as to facilitate holding or supporting both the bulk container 20 and the reservoir 60 in the vertical position, while the material is dispensed from the container 20 to the reservoir 60. In one embodiment of the invention as shown in FIG. 2, the housing 42 has a handle 44 on one end for ease of operation. In the preferred embodiment, the dispenser mechanism 40 generally comprises a linear valve 52 for controlling the amount of dispensed material; a trigger mechanism 54 for activating the linear valve 52; a balance beam 70 that supports the reservoir 60; and an indicator 74, attached to the balance beam 70, for indicating how much material has been dispensed into the reservoir 60.

Although a linear valve 52 is shown in FIG. 3, it should be understood that any valve mechanism might be employed to regulate the flow of solid material through the funnel 50. For example, a rotary valve, or a pincer valve, or even a manual on/off lever may easily be substituted for the linear valve 52. The linear valve 52 is attached at one end to the trigger mechanism 54 via a vertical beam 56. At the other end, the linear valve 52 is secured to a valve return spring 58. The valve return spring 58 serves to return the linear valve 52 to its resting (off) position after the valve has been opened by activating the trigger mechanism 54. The linear valve 52 is placed within the neck 51 of funnel 50. When the valve 52 is activated, by depressing the trigger mechanism 54, material is allowed to flow through the funnel 50 into the reservoir 60. Once the trigger is released, the valve return spring 58 serves to return the valve to the off or closed position, thus discontinuing the flow of material through the funnel.

A bellows 80, preferably an expandable, flexible tube constructed from any suitable material, for example, a rubber, plastic or cloth material that is impervious to the solid material being dispensed, is sealingly placed around the base or dispensing end of the funnel 50 and the top portion of a gimbaled mount 66. Thus, the bellows 80 provides a secure and closed passageway between the funnel 50 and the reservoir 60, through the gimbaled mount 66. The gimbaled mount 66, like the bottle thread adapter 30, provides a secure attachment means for the reservoir 60 and allows for varying sizes of reservoirs to be used. In a preferred embodiment of the invention, the neck 51 of funnel 50 is modified to include outwardly-protruding tabs 82, for secure, leak-proof attachment to a first end of the bellows 80. Likewise, the top portion of mount 66 is similarly adapted to include outwardly-extending mount tabs 67, also for secure, leak-proof attachment to the opposing end of the bellows 80. The bellows 80 will expand to allow the reservoir 60 to travel downwards away from the housing 42. The closed environment provided by use of the bellows 80 ensures that all material passing from the bulk container 20 through the funnel 50 reaches the reservoir 60 and is not deposited within the housing 42, or on either the ground or the operator. This is particularly important in instances where the material dispensed is toxic or corrosive in nature. Further, the bellows 80 allows excess material dispensed into the reservoir 60 to be quickly and safely returned to the bulk container 20 by simply inverting the dispenser mechanism 40 and opening the valve 52. The bulk material is then free to travel back from the reservoir 60, through the funnel 50, and to the bulk container 20.

The reservoir 60 is attached to the housing 42 via gimbaled mount 66. As shown in FIG. 3, the reservoir 60 has a neck portion 62 having external threads 64 thereon. The inner surface of the base of the gimbaled mount 66 has corresponding threads 68 to engage and removably secure the reservoir 60. The mount 66 has an outwardly-extending mount arm 69 that rests beneath a ledge 46 within the housing 42 when the reservoir 60 is in the zero weight or neutral position. The gimbaled mount 66 ensures that, as the reservoir 60 is weighted downwards, the reservoir 60 remains in a vertical orientation with respect to the dispenser mechanism 40. This is important as any deviation from the vertical will affect the indicated weight of the reservoir 60.

Figure 4:
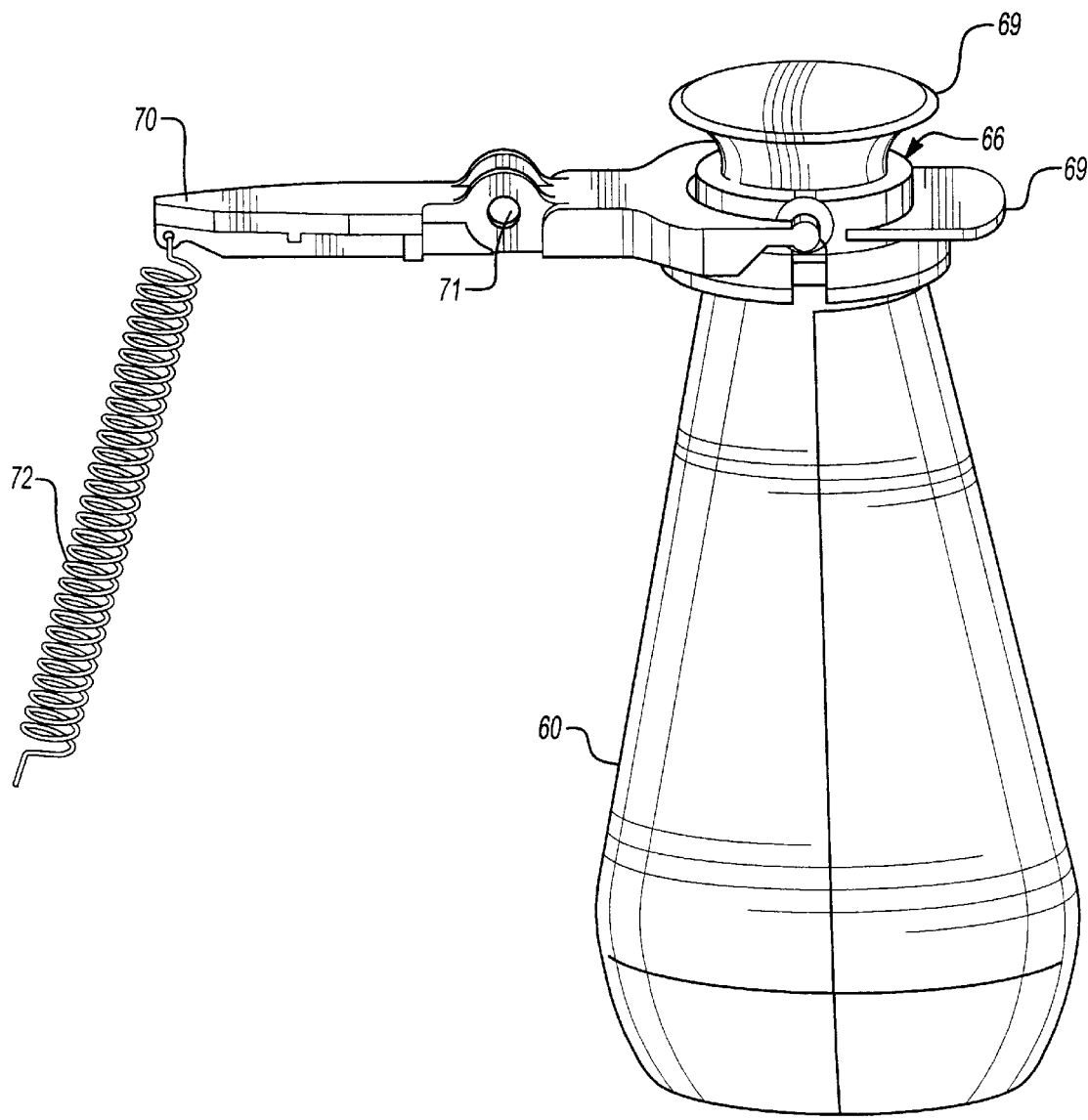
FIG. 4 is a perspective view of the balance beam and spring mechanism as attached to the receiving reservoir.

As shown in FIGS. 3 and 4, the balance beam 70 is used to support the reservoir 60. The balance beam 70 is secured at a first end to a main spring 72, the main spring 72 being secured to the handle housing 44. The other end of the balance beam 70 is shaped in the form of a yoke, and is not attached to the housing. This yoke end of the balance beam 70 is sized to support the gimbaled mount, which in turn is attached to the reservoir 60. The balance beam 70 is further attached to the housing at its fulcrum point 71, such that the balance beam 70 is free to pivot about the fulcrum 71. Also attached to the balance beam is an indicator 74, as shown in FIG. 3. The indicator 74 mechanically corresponds to a scale within a window 76 on the housing 42.

Figure 5:
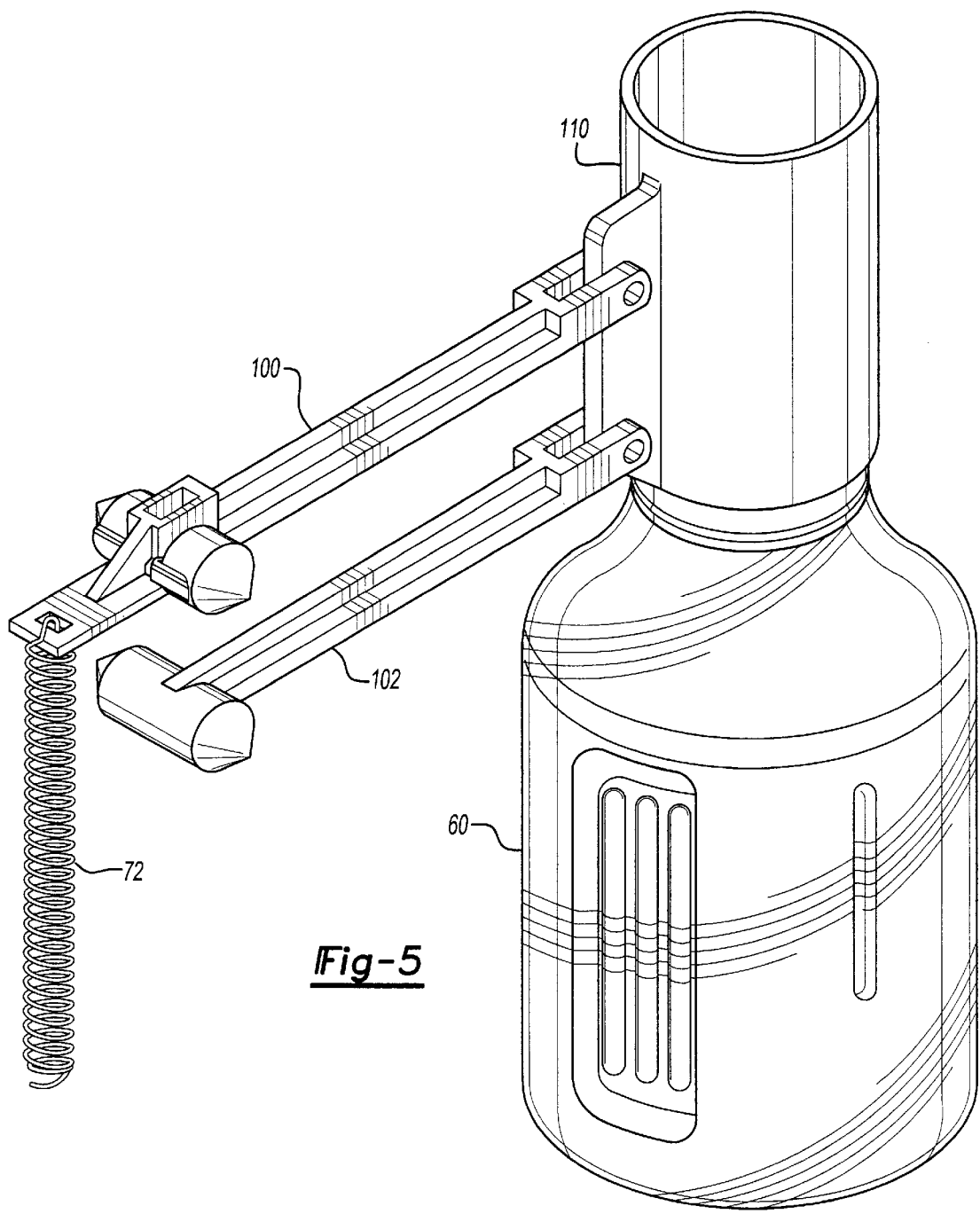
FIG. 5 is a perspective view of the parallel arms supporting mechanism of an alternate embodiment of the invention.

In an alternative embodiment illustrated by FIG. 5, the balance beam 70 is replaced by a pair of parallel arms 100 and 102. The parallel arms 100 and 102 are attached to a collar 110 that supports the receiving reservoir 60. By using parallel arms 100 and 102, attached to collar 110, the receiving reservoir 60 is maintained in its vertical orientation with respect to the dosing dispenser 40, as the reservoir 60 travels downwards. This eliminates the need for the gimbal mechanism.

According to the invention, the weight of the empty reservoir 60 is counterbalanced by the tension in the main spring 72. At this zero weight position, the mount arm 69 abuts against the ledge 46 of the housing 42, and the scale is graduated such that the indicator 74 displays a zero weight through the window 76. As material is dispensed into the reservoir 60, the increase in weight of the reservoir 60 forces the reservoir 60 to descend against the force of the main spring 72, thus rotating the balance beam 70 about fulcrum 71. This in turn deflects the mechanically attached indicator 74. The scale in the window 76 is graduated to correlate the amount of deflection of the indicator 74 to the weight of the reservoir 60. Thus, the indicator 74 will display the amount, by weight, of the material dispensed. The strength or tension within the main spring 72 can be varied depending upon the anticipated quantities of material to be dispensed and the desired amount of indicator 74 deflection within the window 76. As a further aspect of the invention, the scale within the window 76 can be changed to reflect different scale sensitivities or to indicate different units of measurement. Although an indicator and a scale within a window is used to indicate the weight of the material dispensed, other suitable indicia, including a circular dial indicator or electronic indication means, may be used.

Although the gimbaled mount 66 serves to maintain the reservoir 60 in a vertical position with respect to the dispenser mechanism 40, it is beneficial to maintain the dispenser system 10 as close to the vertical as possible as weight measurements are taken. This is because the angle at which the dispenser system 10 is supported will affect both the indicated weight of the reservoir 60 and the position of the indicator 74 along the window 76. A sight bubble 80 or some other level indicator means may therefore be used to indicate to the operator that the dispenser system 10 is maintained in the vertical position.

Figure 6:
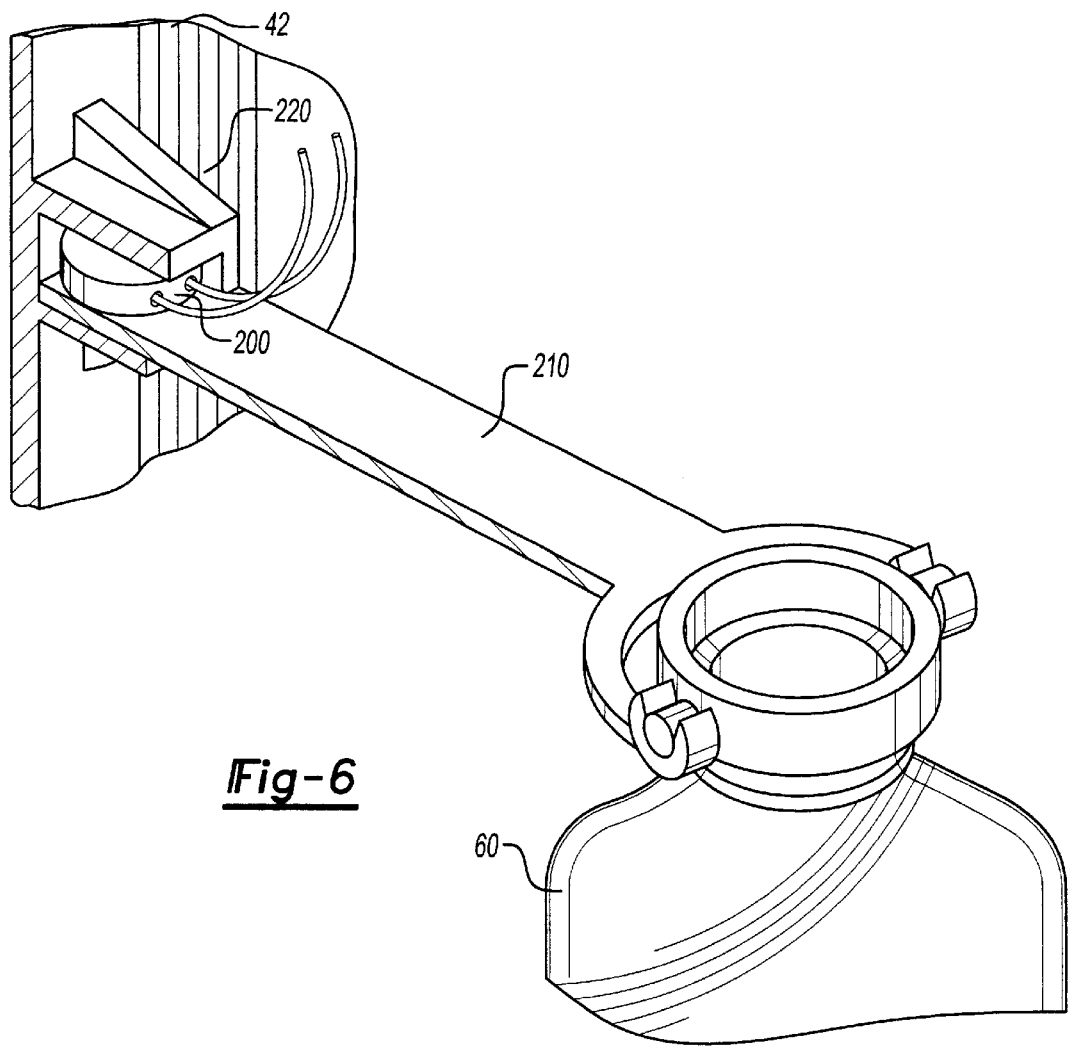
FIG. 6 is a perspective view of the balance beam and load cell variation of the invention.

FIG. 6 illustrates another embodiment of the invention, in which the weight of the dispensed material is calculated using a load cell 200. As shown in FIG. 6, the load cell 200 is mounted to a supporting beam 210. The supporting beam 210 is attached to the housing 42 at one end via a mounting bracket 220. The other end of the supporting beam 210 is shaped in the form of a yoke to receive and support the receiving reservoir 60. As the weight of the receiving reservoir 60 increases, the change in the load is sensed by the load cell and transmitted to a suitable indicator, as is well known in the art.

The foregoing detailed description has been given to facilitate understanding the invention only and no unnecessary limitations should be understood therefrom as some modifications will be obvious to those skilled in the art without departing from the scope and spirit of the appended claims.

What is claimed is:

1. A dosing dispenser for dispensing a specific amount, by weight, of a solid material into a reservoir, comprising:
   a funnel for receiving the solid material, the funnel having a receiving end and a dispensing end;
   a valve mechanism for regulating the flow of solid material from the funnel, the valve mechanism being situated at the dispensing end of the funnel;
   a balance beam having an attaching end and a supporting end, the attaching end being attached to a resistance spring and the supporting end, formed in the shape of a yoke, supporting the reservoir, and wherein the balance beam pivots about a fulcrum point;
   a gimbaled mount which rests upon the supporting end of the balance beam, the reservoir being connected to the gimbaled mount, such that the reservoir is maintained in a vertical orientation as the beam is depressed downwards;
   a bellows, the bellows being sealingly attached at one end to the funnel and at the other end to the gimbaled mount, thereby creating a closed system between the funnel and the reservoir; and
   an indicator connected to the balance beam, such that as the solid material is introduced into the reservoir, the weight of the material displaces the balance beam, which, in turn, displaces the indicator along a scale.

2. The dosing dispenser as described in claim 1, further comprising a trigger mechanism connected to the valve mechanism, for opening and closing the valve mechanism.

3. The dosing dispenser as described in claim 2, wherein the valve mechanism for regulating the flow of solid material from the funnel is a linear valve, the linear valve being attached to a trigger mechanism, such that as the trigger is displaced the valve opens allowing material to flow through the funnel into the reservoir, and when the trigger is released, the valve closes shutting off the flow of material through the funnel.

4. A hand-held dosing dispenser system for dispensing a specific amount, by weight, of a solid material into a reservoir, comprising:
   a container containing the solid material to be dispensed;
   a funnel for receiving the solid material, the funnel having a receiving end connected to the container, and a dispensing end;
   a container adapter having a first end and a second end, the first end of the container adapter being attached to the receiving end of the funnel, and the second end of the container adapter being connected to the container, thereby creating a closed system between the container and the funnel;
   a valve mechanism for regulating the flow of solid material from the funnel, the valve mechanism being situated at the dispensing end of the funnel;
   an activating device connected to the valve mechanism;
   a balance beam having an attaching end and a supporting end, the attaching end being attached to a resistance spring and the supporting end being connected to the reservoir; and
   an indicator connected to the balance beam, such that as the solid material is introduced into the reservoir, the weight of the material displaces the balance beam, which displaces the indicator along a scale.

5. The dosing dispenser system as described in claim 4, wherein the valve mechanism for regulating the flow of solid material from the funnel, is a linear valve attached to a trigger mechanism, such that as the trigger is displaced the valve opens allowing material to flow through the funnel into the reservoir, and when the trigger is released, the valve closes shutting off the flow of material through the funnel.

6. The dosing system as described in claim 4, wherein the valve mechanism for regulating the flow of solid material through the funnel is a rotary valve.

7. The dosing dispenser system as described in claim 4, wherein the supporting end of the balance beam is formed in the shape of a yoke.

8. The dosing dispenser system as described in claim 7, further comprising a gimbaled mount sealingly attached to the reservoir such that the reservoir is maintained in a vertical orientation as the beam is depressed downwards, the gimbaled mount being sized to rest within the yoke contour of the supporting end of the balance beam.

9. The dosing dispenser system as described in claim 8, further comprising a bellows having a first end and a second end, the first end being attached to the dispensing end of the funnel and the second end being attached to the gimbaled mount, thereby creating a closed system between the funnel and the reservoir.

10. The dosing dispenser system as described in claim 9, wherein the bellows is an expandable tube, of a material impervious to the solid material being dispensed.

11. A dosing dispenser system for dispensing a specific amount, by weight, of a solid material into a reservoir, comprising:
   a container containing the solid material to be dispensed;
   a housing having a receiving surface, a dispensing surface and a handle portion;
   a funnel, contained within the housing, for receiving the solid material having a receiving end and a dispensing end, the receiving end of the funnel being in communication with the container through an opening in the receiving surface of the housing;
   a valve mechanism, contained within the housing, for regulating the flow of solid material from the funnel, the valve mechanism being situated at the dispensing end of the funnel;

an activating device connected to the valve mechanism;

a balance beam, contained within the housing, having an attaching end and a supporting end, the supporting end being connected to the reservoir;

a resistance spring anchored at one end to the handle portion of the housing, and attached at the other end to the attaching end of the balance beam; and an indicator connected to the balance beam, such that as the solid material is introduced into the reservoir, the weight of the material displaces the balance beam, which displaces the indicator along a scale.

12. The dosing dispenser system as described in claim 11, wherein the supporting end of the balance beam is formed in the shape of a yoke.

13. The dosing dispenser system as described in claim 12, further comprising a gimbaled mount sealingly attached to the reservoir such that the reservoir is maintained in a vertical orientation as the beam is depressed downwards, the gimbaled mount being sized to rest within the yoke contour of the supporting end of the balance beam.

14. The dosing dispenser system as described in claim 13, further comprising a bellows having a first end and a second end, the first end being attached to the dispensing end of the funnel and the second end being attached to the gimbaled mount, thereby creating a closed system between the funnel and the reservoir.

15. The dosing dispenser system as described in claim 14, wherein the bellows is an expandable tube, of a material impervious to the solid material being dispensed.

* * * * *